United States Patent
Taylor, Jr. et al.

(10) Patent No.: US 12,091,865 B2
(45) Date of Patent: Sep. 17, 2024

(54) INSULATED WALL PANEL

(71) Applicant: DDP Specialty Electronic Materials US, LLC., Wilmington, DE (US)

(72) Inventors: Charles David Taylor, Jr., Salisbury, NC (US); Paul Addison Brown, Salisbury, NC (US); Berthold Mueller, Salisbury, NC (US); Randal Scott Hoffner, Salisbury, NC (US); Stewart McIntyre Adams, Salisbury, NC (US)

(73) Assignee: DDP Specialty Electronic Materials US, LLC., Wilmington, DE (US)

( * ) Notice: Subject to any disclaimer, the term of this patent is extended or adjusted under 35 U.S.C. 154(b) by 0 days.

(21) Appl. No.: 18/471,383

(22) Filed: Sep. 21, 2023

(65) Prior Publication Data

US 2024/0011302 A1    Jan. 11, 2024

Related U.S. Application Data

(60) Division of application No. 18/339,542, filed on Jun. 22, 2023, which is a continuation of application No.
(Continued)

(51) Int. Cl.
*E04C 2/04* (2006.01)
*B29C 44/12* (2006.01)
(Continued)

(52) U.S. Cl.
CPC .......... *E04F 13/0873* (2013.01); *B29C 44/12* (2013.01); *E04C 2/04* (2013.01);
(Continued)

(58) Field of Classification Search
CPC ................ E04F 13/0873; E04F 13/075; E04F 13/077; E04F 13/0832; E04F 13/0862;
(Continued)

(56) References Cited

U.S. PATENT DOCUMENTS 2,064,789 A    12/1936  Farber
2,170,165 A     8/1939  Strong
(Continued)

FOREIGN PATENT DOCUMENTS

AU    2010101323 A4    1/2011
DE       2361018 A1    6/1978
JP      08189275 A     7/1996

OTHER PUBLICATIONS

2 Page PDF Form the US Department of Energy Title Guide to Home Insulation, Oct. 2010.
(Continued)

*Primary Examiner* — Monica A Huson
*Assistant Examiner* — Kelsey C Grace
(74) *Attorney, Agent, or Firm* — Shumaker, Loop & Kendrick, LLP; S. Alexander Long, Jr.

(57) ABSTRACT

The invention is related to a method of manufacturing a wall panel and a wall panel system. The method includes forming a glass-fiber reinforced cementitious layer including the steps of: pouring or injecting a slurry of uncured cementitious product into a mold, embedding glass fiber reinforcing material therein, and curing the cementitious product to obtain a cured cementitious product having a first side and a second side; and applying, to the second side of the cured cementitious product, an insulation layer, the insulation layer comprising a foam.

5 Claims, 5 Drawing Sheets

Related U.S. Application Data

15/907,503, filed on Feb. 28, 2018, now abandoned, which is a continuation of application No. 15/138,638, filed on Apr. 26, 2016, now Pat. No. 9,957,722, which is a continuation of application No. 14/039,101, filed on Sep. 27, 2013, now Pat. No. 9,353,523.

(60) Provisional application No. 61/706,148, filed on Sep. 27, 2012.

(51) Int. Cl.
  *E04F 13/075* (2006.01)
  *E04F 13/077* (2006.01)
  *E04F 13/08* (2006.01)
  *E04F 13/14* (2006.01)
  *E04F 13/16* (2006.01)
  E04C 2/288 (2006.01)

(52) U.S. Cl.
  CPC .......... *E04F 13/075* (2013.01); *E04F 13/077* (2013.01); *E04F 13/0832* (2013.01); *E04F 13/0862* (2013.01); *E04F 13/0866* (2013.01); *E04F 13/0875* (2013.01); *E04F 13/14* (2013.01); *E04F 13/165* (2013.01); *E04C 2/288* (2013.01)

(58) Field of Classification Search
  CPC .............. E04F 13/0866; E04F 13/0875; E04F 13/14; E04F 13/165; B29C 44/12; E04C 2/04; E04C 2/288
  See application file for complete search history.

(56) References Cited

U.S. PATENT DOCUMENTS

| | | | |
|---|---|---|---|
| 2,198,466 A | 4/1940 | Stolze | |
| 2,825,221 A | 3/1958 | Brouk | |
| 3,304,673 A | 2/1967 | Ramoneda | |
| 3,350,827 A | 11/1967 | Sugar | |
| 3,362,116 A | 1/1968 | Murphy | |
| 3,602,476 A | 8/1971 | Iragorri | |
| 3,605,369 A | 9/1971 | Merrill et al. | |
| 3,646,715 A | 3/1972 | Pope | |
| 3,715,417 A | 2/1973 | Pope | |
| 3,740,909 A | 6/1973 | Stinnes | |
| 3,760,546 A | 9/1973 | Martin | |
| 3,842,559 A | 10/1974 | Payne | |
| 3,868,801 A | 3/1975 | Weiner | |
| 3,899,855 A | 8/1975 | Gadsby | |
| 3,965,635 A | 6/1976 | Renkert | |
| 3,991,252 A | 11/1976 | Kolakowski | |
| 4,031,682 A | 6/1977 | Renkert | |
| 4,037,006 A | 7/1977 | Roberts | |
| 4,159,361 A | 6/1979 | Schupack | |
| 4,203,788 A | 5/1980 | Clear | |
| 4,219,984 A | 9/1980 | De San | |
| 4,296,789 A | 10/1981 | Schramm | |
| 4,298,413 A | 11/1981 | Teare | |
| 4,349,398 A | 9/1982 | Kearns | |
| 4,388,366 A | 6/1983 | Rosato | |
| 4,407,104 A | 10/1983 | Francis | |
| 4,494,349 A | 1/1985 | Clements | |
| 4,506,486 A | 3/1985 | Culpepper, Jr. | |
| 4,614,013 A | 9/1986 | Stevenson | |
| 4,617,219 A | 10/1986 | Schupack | |
| 4,646,498 A | 3/1987 | Schneller | |
| 4,657,798 A | 4/1987 | Gulhem | |
| 4,788,808 A | 12/1988 | Slocum | |
| 4,816,091 A | 3/1989 | Miller | |
| 4,916,004 A | 4/1990 | Ensminger | |
| 4,920,716 A | 5/1990 | Coffey | |
| 4,944,127 A | 7/1990 | Clear | |
| 5,003,743 A | 4/1991 | Bifano | |
| 5,007,532 A | 4/1991 | Binish | |
| 5,009,387 A | 4/1991 | Scott | |
| 5,231,813 A | 8/1993 | Drawdy | |
| 5,280,689 A | 1/1994 | Mill | |
| 5,394,672 A | 3/1995 | Seem | |
| 5,502,940 A | 4/1996 | Fifield | |
| 5,600,929 A | 2/1997 | Morris | |
| 5,626,936 A | 5/1997 | Alderman | |
| 5,631,097 A * | 5/1997 | Andersen | B32B 37/00 428/312.4 |
| 5,681,639 A | 10/1997 | Minagawa | |
| 5,715,637 A | 2/1998 | Hesterman | |
| 5,735,092 A | 4/1998 | Clayton | |
| 5,836,572 A | 11/1998 | Sugiyama | |
| 5,839,251 A | 11/1998 | Weinstein | |
| 6,044,604 A | 4/2000 | Clayton | |
| 6,240,691 B1 | 6/2001 | Holzkaemper | |
| 6,360,505 B1 | 3/2002 | Johns | |
| 6,516,578 B1 | 2/2003 | Hunsaker | |
| 6,701,683 B2 | 3/2004 | Messenger | |
| 6,857,248 B2 | 2/2005 | Ouellet et al. | |
| 6,951,086 B2 | 10/2005 | Passeno | |
| 7,165,374 B2 | 1/2007 | Ohanesian | |
| 7,641,812 B2 | 1/2010 | Alderman | |
| 7,658,050 B2 | 2/2010 | Bouchard | |
| 7,762,040 B2 | 7/2010 | Wilson | |
| 7,871,054 B2 | 1/2011 | Walters | |
| 7,908,814 B2 | 3/2011 | Wilson | |
| 8,287,997 B2 | 8/2012 | Paradis | |
| 8,273,415 B2 | 9/2012 | Porter | |
| 8,444,789 B2 | 5/2013 | Guo | |
| 8,621,801 B2 | 1/2014 | Bouchard | |
| 8,627,625 B2 | 1/2014 | Bouchard | |
| 9,234,355 B2 | 1/2016 | Sealock et al. | |
| 9,303,403 B2 | 4/2016 | Bolin | |
| 9,353,523 B2 | 5/2016 | Taylor, Jr. | |
| 9,809,981 B2 | 11/2017 | Ciuperca | |
| 9,957,722 B2 | 5/2018 | Taylor, Jr. et al. | |
| 9,963,885 B2 | 5/2018 | Taylor, Jr. | |
| 2002/0182953 A1 | 12/2002 | Porter | |
| 2003/0113520 A1 * | 6/2003 | Takahashi | D21H 27/28 428/201 |
| 2003/0213212 A1 | 11/2003 | Passeno | |
| 2005/0028476 A1 | 2/2005 | Bouchard et al. | |
| 2005/0076611 A1 | 4/2005 | Crawford | |
| 2005/0229504 A1 | 10/2005 | Bennet | |
| 2005/0229524 A1 | 10/2005 | Bennet | |
| 2005/0257469 A1 | 11/2005 | Bennet | |
| 2006/0174572 A1 | 8/2006 | Tonyan | |
| 2007/0261340 A1 | 11/2007 | Cecilio | |
| 2008/0066412 A1 | 3/2008 | Franco et al. | |
| 2009/0011207 A1 | 1/2009 | Dubey | |
| 2009/0211692 A1 | 8/2009 | Krebs | |
| 2010/0095629 A1 | 4/2010 | Taylor | |
| 2010/0126114 A1 | 5/2010 | Sadler | |
| 2010/0199586 A1 | 8/2010 | Martineau | |
| 2010/0297411 A1 | 11/2010 | Tsai | |
| 2011/0239566 A1 | 10/2011 | Ciuperca | |
| 2011/0238916 A1 | 11/2011 | Pardue, Jr. | |
| 2012/0266554 A1 | 10/2012 | Fifield | |
| 2014/0069050 A1 | 3/2014 | Bolin | |
| 2014/0083040 A1 | 3/2014 | Taylor | |
| 2014/0093679 A1 | 4/2014 | Okamoto | |
| 2014/0234560 A1 | 8/2014 | Miyata | |
| 2015/0052838 A1 | 2/2015 | Ritchie | |
| 2016/0237692 A1 | 8/2016 | Taylor, Jr. et al. | |
| 2016/0280879 A1 | 9/2016 | Brannum | |
| 2017/0037639 A1 | 2/2017 | Taylor, Jr. | |
| 2018/0187420 A1 | 7/2018 | Taylor | |
| 2019/0119927 A1 | 4/2019 | Hunsaker | |
| 2021/0310255 A1 | 10/2021 | Taylor | |
| 2022/0090387 A1 | 3/2022 | Hunsaker | |

OTHER PUBLICATIONS

International Search Report for PCT/US2016/029954 Dated Oct. 7, 2016 7 Pages.

* cited by examiner

INSULATED WALL PANEL

CROSS-REFERENCE TO RELATED PATENT APPLICATIONS

This application is a divisional of co-pending U.S. patent application Ser. No. 18/339,542 filed on Jun. 22, 2023, which itself is a continuation of co-pending US patent application having application Ser. No. 15/907,503 filed on Feb. 28, 2018, which itself is a continuation of US patent application having application Ser. No. 15/138,638 filed on Apr. 26, 2016, which itself is a continuation of US patent application having application Ser. No. 14/039,101 filed on Sep. 27, 2013, which itself is a nonprovisional application tracing priority to US provisional patent application having application No. 61/706,148 filed on Sep. 27, 2012. This application claims the full benefit of, traces priority to, and expressly incorporates by reference the entirety of all of the Ser. No. 15/907,503 application, the Ser. No. 15/138,638 application, the Ser. No. 14/039,101 application, and the 61/706,148 application.

TECHNICAL FIELD AND BACKGROUND OF INVENTION

The invention relates to the field of building construction materials. More particularly, the invention relates to the field of construction components used in the construction of walls and other planar surfaces for buildings.

Humans have utilized bricks and other hard surfaces as construction components for buildings for thousands of years. The earliest sun dried bricks were made in Ancient Egypt. Later, bricks were dried using a fuel source. The Book of Genesis records that burnt brick was used in the construction of the Tower of Babel. Thus, from ancient times to the present, brick has remained a popular building material.

The enduring presence of brick is due in no small part to its stellar properties as an exterior surface. Bricks are capable of resisting high summer heat as well as cold winters and changes there between. In addition to such thermal properties, brick provides a strong outer shell to a building. Brick resists wind, rain, snow, dust and other detrimental environmental elements. Bricks can be manufactured in a myriad of sizes, textures, and colors. Further, though it need not be painted, when brick is painted, the paint adheres well to the brick.

However, despite such positive characteristics, brick has a few drawbacks, mostly related to installation. For instance, whereas other exterior surfaces may be relatively easily applied to an existing building structure, brick is much more difficult to install on an existing building as an alternate siding choice during a renovation. Further, the laying of brick during the construction of a building is a labor intensive operation. Each brick must be mortared and laid, one on another, brick by brick, by a skilled brick mason. As manual labor prices rise in a given market, so do the costs associated with using brick as a building material.

Thus, there exists a need for a building product that has the same or better building characteristics and aesthetic appeal as traditional brick but also can be applied without the need for an extensive skilled labor team of brick masons. Further, there exists a need for a building product that has the same or better building characteristics and aesthetic appeal as traditional brick that may be used as a retro-fit product for providing a siding to an existing building structure. Further, as energy costs and environmental consciousness increase, so too does the demand for better insulation. Thus, there is also a need for building materials offering improved insulation of a building's envelope.

SUMMARY OF THE INVENTION

In one aspect, the invention includes a method of manufacturing a wall panel. The method includes: forming a glass-fiber reinforced cementitious layer which includes the steps of: i) pouring or injecting a slurry of uncured cementitious product into a mold, ii) embedding glass fiber reinforcing material therein, and iii) curing the cementitious product to obtain a cured cementitious product having a first side and a second side; and applying, to the second side of the cured cementitious product, an insulation layer, the insulation layer comprising a foam.

In some embodiments, the glass-fiber reinforcing material is configured to be the principal load carrying member of the wall panel.

In some embodiments, the method further includes applying a veneer layer to the first side of the cured cementitious product. In some embodiments, the veneer layer is clay brick, ceramic tile, porcelain tile, natural stone, engineered stone, or paint. In some embodiments, the veneer layer functions as a water-resistive barrier.

In some embodiments, the insulation layer has a uniform thickness and an insulation factor greater than or equal to R7 and less than or equal to R21.

In another aspect, the invention includes a method of forming a wall panel system for a building structure. The method includes: a) providing a plurality of wall panels, each of the plurality of wall panels comprising: a middle layer having a first side and a second side, the middle layer comprising: cementitious product and glass fiber reinforcing material embedded therein; and a foam layer on the second side of the middle layer; b) securing each of the plurality of wall panels to a structural element; wherein seams between the respective wall panels are sealed.

In some embodiments, the seams are sealed with a sealing compound.

In some embodiments, each of the plurality of wall panels further comprises a veneer layer attached to the first side of the middle layer. In some embodiments, the veneer layer is clay brick, ceramic tile, porcelain tile, natural stone, engineered stone, or paint. In some embodiments the veneer layer functions as a water-resistive barrier.

In some embodiments, the method of forming a wall panel system further includes, after step b), step c) applying a veneer layer to the first side of the middle layer. In some embodiments, the veneer layer is clay brick, ceramic tile, porcelain tile, natural stone, engineered stone, or paint. In some embodiments the veneer layer functions as a water-resistive barrier.

In some embodiments, the glass-fiber reinforcing material is configured to be the principal load carrying member of the wall panel.

In some embodiments, the insulation layer has a uniform thickness and an insulation factor greater than or equal to R7 and less than or equal to R21.

In another aspect, the present invention includes a wall panel. The wall panel includes a middle layer having a first side and a second side, the middle layer comprising a cementitious product and a glass fiber reinforcing material; and a foam layer attached to the second side of the middle layer.

In some embodiments, the wall panel further comprises a veneer layer on the first side of the middle layer. In some embodiments the veneer layer is clay brick, ceramic tile, porcelain tile, natural stone, engineered stone, or paint. In some embodiments the veneer layer functions as a water-resistive barrier.

In some embodiments, the middle layer is a poured, injected, press-molded, extruded, vibration cast, sprayed, or slip formed layer.

BRIEF DESCRIPTION OF THE DRAWINGS FIGURES

Features, aspects, and advantages of a preferred embodiment of the invention are better understood when the detailed description is read with reference to the accompanying drawing, in which.

DETAILED DESCRIPTION

Figure 1:
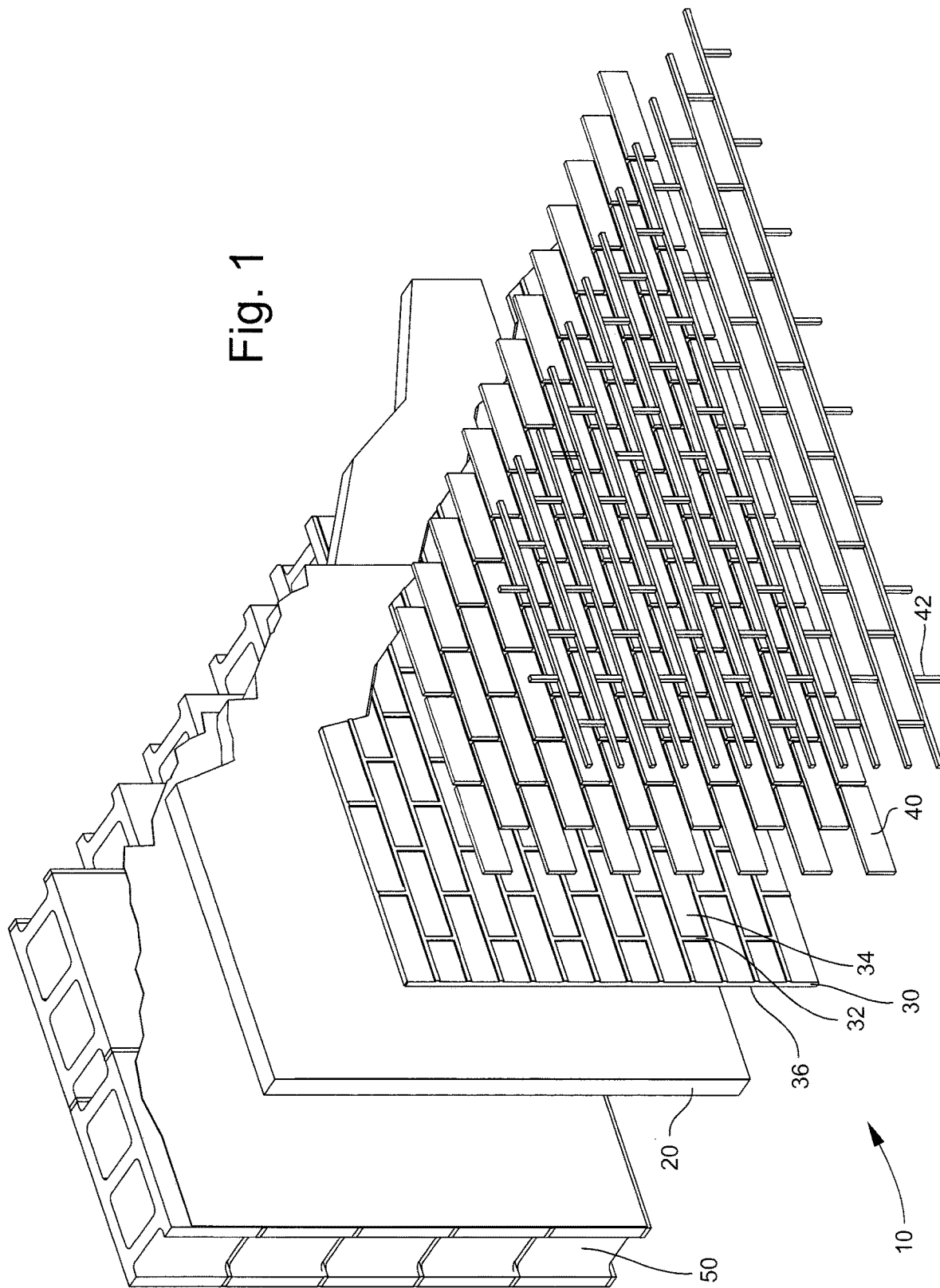
FIG. 1 is an exploded perspective view of an embodiment of the invention showing the layers.

It is to be understood by a person having ordinary skill in the art that the present discussion is a description of exemplary embodiments only and is not intended as limiting the broader aspects of the present invention. The following example is provided to further illustrate the invention and is not to be construed to unduly limit the scope of the invention.

Referring to FIGS. 1-5, the invention is an insulated wall panel 10 having three layers, 20, 30, and 40. The panel 10 provides a finished aesthetic surface to a building, a structural component to a building, and an insulation factor for a building. As such, the installed wall panel 10 includes an inner insulation layer 20, a middle cement layer 30, and an outer veneer layer 40. The panel 10 may be attached to a building wall 50.

Figure 4:
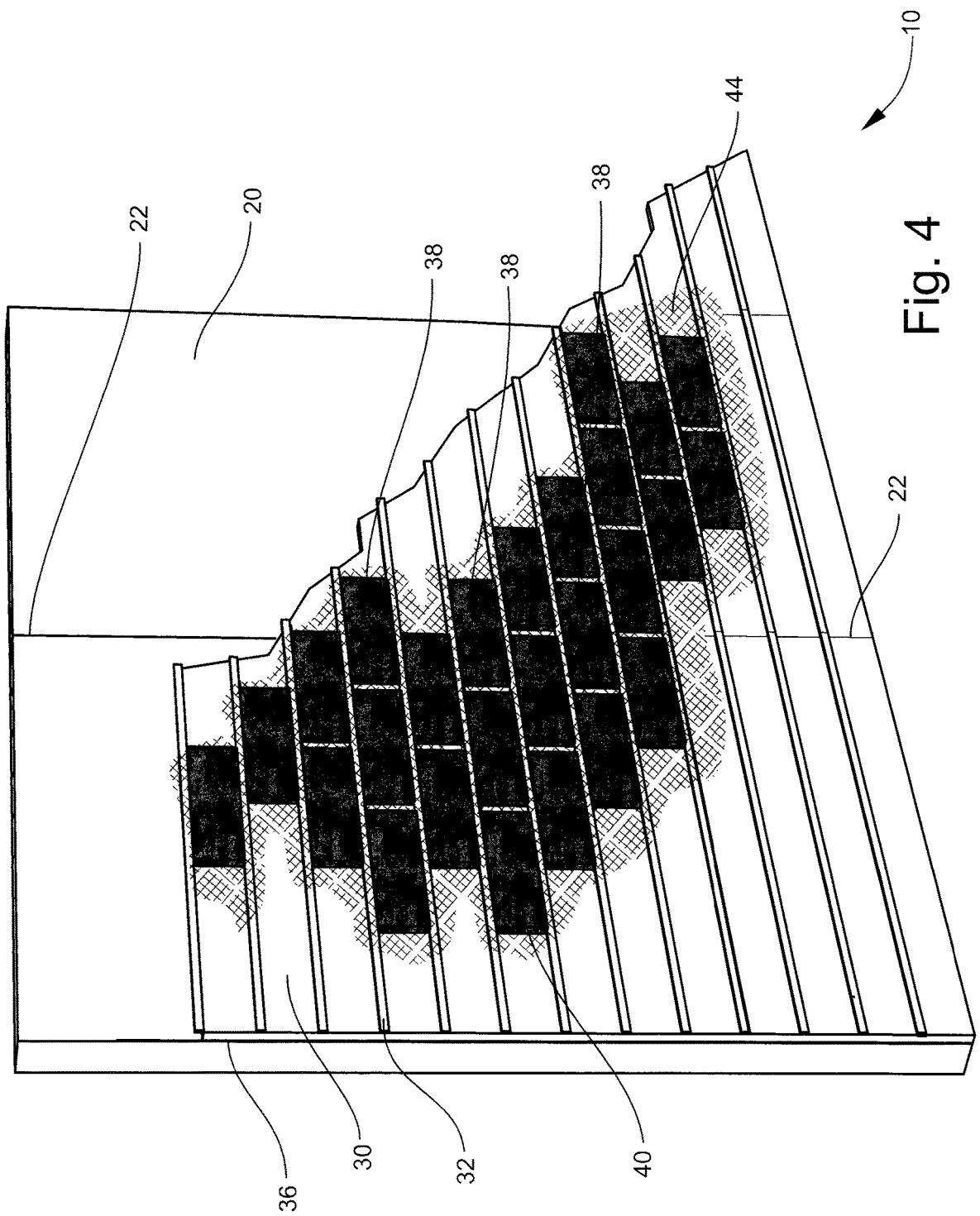
FIG. 4 is perspective view of an embodiment of the invention showing two adjacent panels with the outer veneer layer partially attached and covering the joint between the two adjacent panels.

The outer veneer layer 40 may include brick (as shown in the drawings) but may also include stone, tile, engineered stone, and/or similar material depending on desired finish effect. Thus, the use of the term "brick" herein is synonymous and inclusive of other veneers thus listed. The veneer layer 40 is relatively thin and is attached to the middle cement layer 30 using mortar 44 or other appropriate material such as a chemical adhesive as best shown in FIG. 4. Each brick (or other material as desired) of the veneer layer 40 is thin and is defined by a perimeter.

The middle layer 30 provides a substrate to which the brick of the veneer 40 is applied upon installation on a building structure 50. The middle layer 30 has a plurality of sets of relief lines 32. Each set of relief lines 32 define a boundary that is just larger than the perimeter of a particular brick of the veneer layer 40 that is to be applied to the middle layer 30. The relief lines 32 may be formed to the thickness of the desired grout 42 spacing between the brick of the veneer layer 40.

The middle layer 30 is made of a cementatious product with a glass fiber reinforcing material embedded therein. The glass fiber has a high strength and is the principal load-carrying member of the middle layer 30 while the cement forms a matrix that allows the fibers to retain their desired location and orientation. The resultant product is thin and strong.

In order to form the middle layer 30, a mold is first constructed into which a slurry of uncured cementatious product of the middle layer 30 is poured. The mold will have the negatives of the relief lines 32 formed therein. These negatives will appear as small trenches within the mold such that when the cement cures and the middle layer 30 is removed from the mold, the relief lines 32 will protrude outward from the otherwise generally planar outer surface 34 of the middle layer. The inner surface 36 of the middle layer 30 will also be generally planar but will not have such relief lines 32. The middle layer 30 may remain in the mold while curing. Curing time is dependent upon the thickness, particulars of the mix design, and the environment in which the cement is being cured. Preferably, the middle cement layer 30 is cured in a chamber.

Once cured, the middle layer 30 is then placed in a fixture that allows the inner insulation layer 20 to be applied and attached to the inner surface 36 of the middle layer 30. The inner insulation layer 20 is a rigid pour foam that is formed from a two part Class I rated urethane. The foam is non-CFC and non-HCFC. The foam is applied to the inner surface 36 of the middle layer 30 using a machine calibrated to deliver proper and consistent component mix. The finished urethane material 20 will have an in place density of approximately 2.2 pounds per cubic foot. The foam 20 adheres to the middle layer 30 such that the machine delivery and mixing of the components provides for a complete bond between the middle layer 30 and inner insulation layer Thus, there are no adhesives or other chemical bonding required to achieve the strength of the final insulated panel 10. The inner insulation layer 20 may be one inch thick or up to three inches thick or greater depending on the level of insulation desired for a particular application.

Alternatively, rather than being poured, the middle layer 30 may be press-molded, extruded, vibration cast, sprayed, or slip formed. If, in alternate embodiments, attachment points 54 or other items are incorporated into the structure they are placed in the mold prior to the injection of the urethane.

Figure 2:
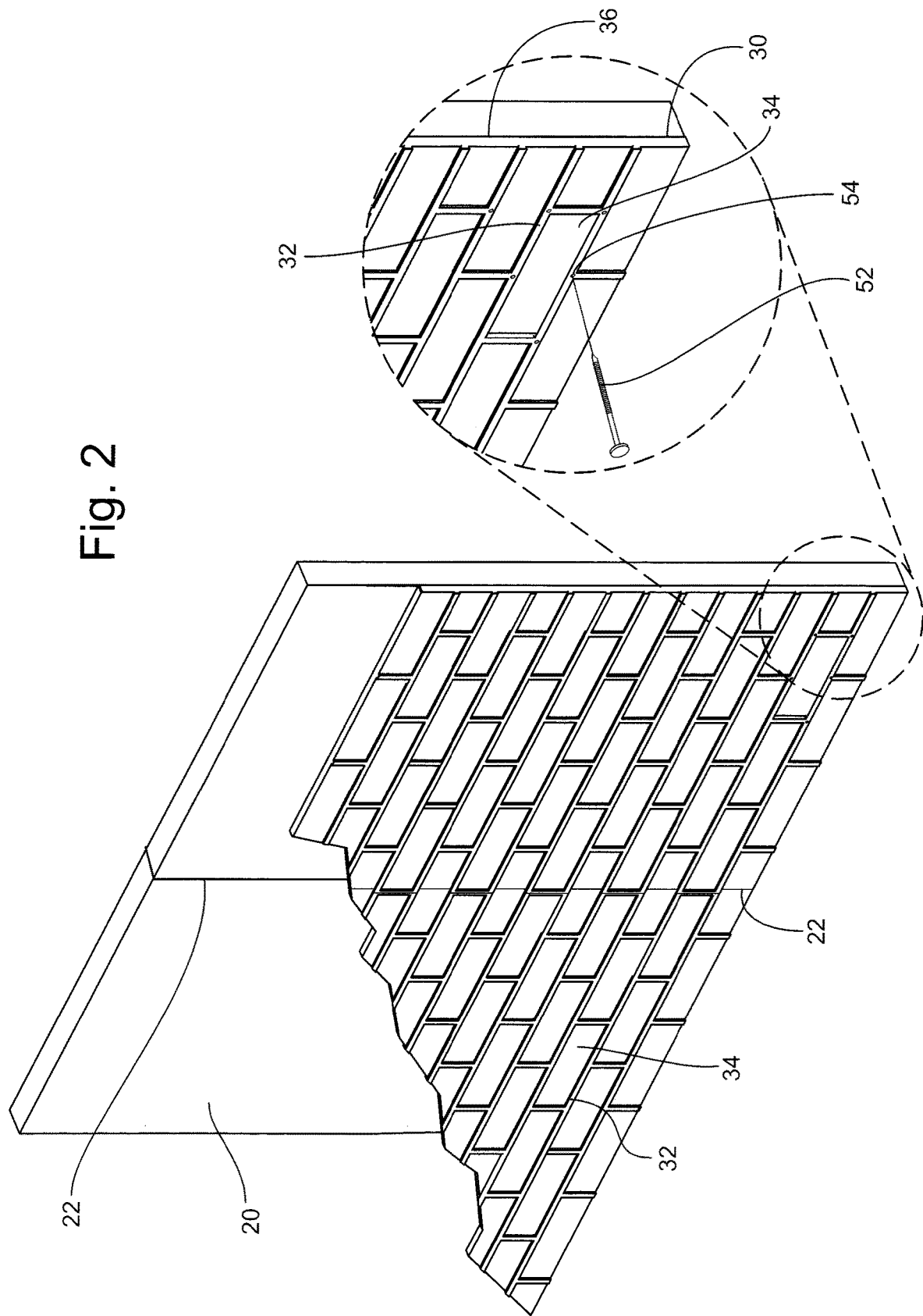
FIG. 2 is a partial perspective view of an embodiment of the invention showing two adjacent panels and highlighting the attachment of the panels to a wall.
Figure 3:
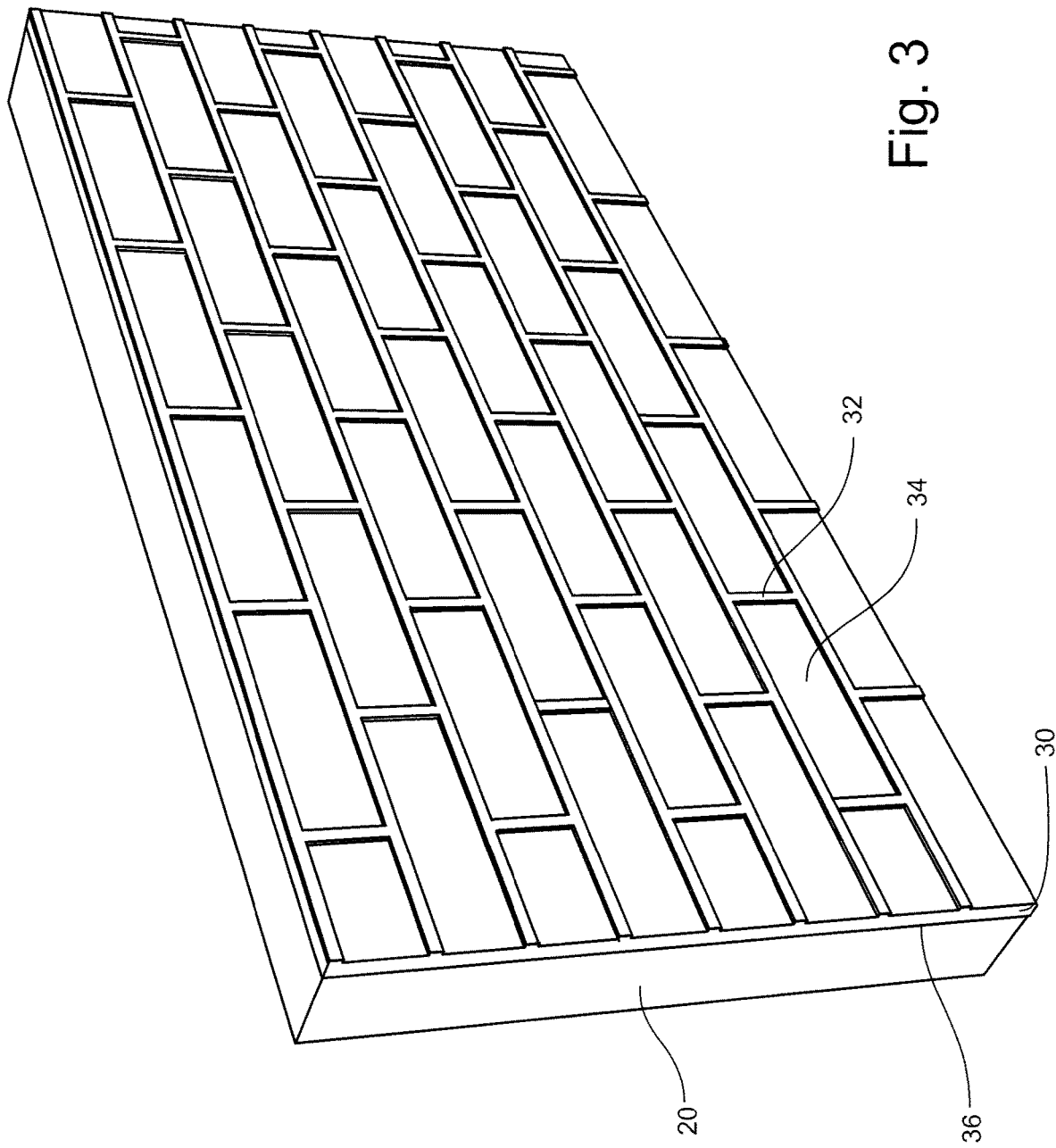
FIG. 3 is a perspective view of an embodiment of the invention showing one panel without the outer veneer layer attached.
Figure 5:
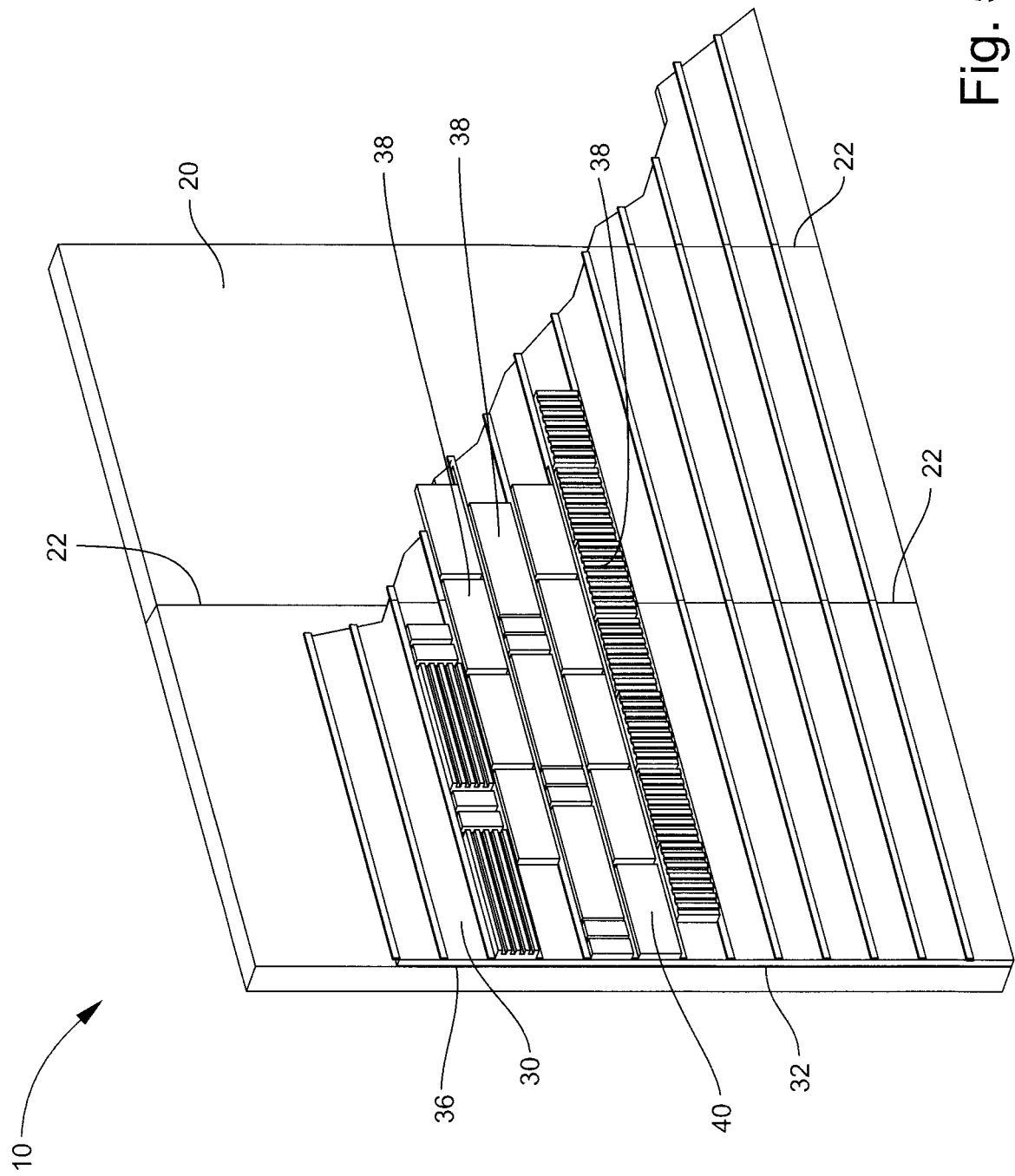
FIG. 5 is a perspective view of an embodiment of the invention showing adjacent panels with the outer veneer layer partially attached and covering the joint between two adjacent panels.

Once the cement and urethane foam of the respective middle 30 and inner 20 layers has cured, the panel 10 is in condition for application to a building 50. As shown in FIG. 2, the panels 10 are screwed with screws 52 to the wall 50 or other structural element of a building. End pieces, headers, and other trim pieces, having been similarly manufactured, are likewise attached to the building. The seams 22 between the respective panels and trim pieces are sealed with a sealing compound, such as Laticrete® Air and Water Barrier. Next, as shown in FIG. 4, an adhesive such as mortar 44 is applied to the outer surface of the middle layer 30. Next, the brick of the veneer layer 40 are applied on top of the adhesive 44 and between the relief lines 32. The brick of the veneer 40 are applied to overlap 38 the seams 22 in the panels 10. This overlapping 38 of the seams is best shown in FIGS. 4 and 5. Finally, a grout 42 or other material is applied between the gaps in the brick of the veneer 40.

We claim:

1. A wall panel comprising:
    a middle layer having a first side and a second side, the middle layer comprising a cementitious product and a glass fiber reinforcing material; and
    a foam insulation layer attached to the second side of the middle layer, wherein the foam insulation layer is chemically bound to the second side of the middle layer without the use of an adhesive.

2. The wall panel of claim 1 further comprising a veneer layer on the first side of the middle layer.

3. The wall panel of claim 2, wherein the veneer layer is clay brick, ceramic tile, porcelain tile, natural stone, engineered stone, or paint.

4. The wall panel of claim 2, wherein the veneer layer functions as a water resistive barrier.

5. The wall panel of claim 1, wherein the middle layer is a poured, injected, press-molded, extruded, vibration cast, sprayed, or slip formed layer.

* * * * *